United States Patent
Saukkola et al.

(10) Patent No.: US 11,313,493 B2
(45) Date of Patent: Apr. 26, 2022

(54) CONTAINMENT SLEEVE FOR PRESSURIZED PIPING SYSTEM

(71) Applicants: Sharon Saukkola, Monticello, MN (US); Randall Brolander, Monticello, MN (US); Dustin Ericson, Monticello, MN (US); Bradley Barger, Monticello, MN (US)

(72) Inventors: Sharon Saukkola, Monticello, MN (US); Randall Brolander, Monticello, MN (US); Dustin Ericson, Monticello, MN (US); Bradley Barger, Monticello, MN (US)

(73) Assignee: Suburban Manufacturing, Inc., Monticello, MN (US)

( * ) Notice: Subject to any disclaimer, the term of this patent is extended or adjusted under 35 U.S.C. 154(b) by 194 days.

(21) Appl. No.: 16/747,278

(22) Filed: Jan. 20, 2020

(65) Prior Publication Data

US 2021/0222803 A1 Jul. 22, 2021

(51) Int. Cl.
*F16L 11/00* (2006.01)
*F16L 9/04* (2006.01)
*F16L 43/00* (2006.01)

(52) U.S. Cl.
CPC .............. *F16L 9/04* (2013.01); *F16L 43/00* (2013.01)

(58) Field of Classification Search
CPC ..................................... F16L 9/04; F16L 43/00
USPC ................ 138/172, 110, 121, 122, 161, 173
See application file for complete search history.

(56) References Cited

U.S. PATENT DOCUMENTS

| | | | | |
|---|---|---|---|---|
| 2,343,614 A | * | 3/1944 | Harpham | D05B 93/00 112/427 |
| 2,897,603 A | * | 8/1959 | Behrman | A45D 20/18 34/99 |
| 3,833,267 A | | 9/1974 | McCumber | |
| 4,164,058 A | * | 8/1979 | Barna | A47G 21/16 24/1 |
| 4,168,726 A | | 9/1979 | Klennert | |
| 4,207,918 A | | 6/1980 | Burns et al. | |
| 4,263,942 A | * | 4/1981 | Lenhart | A22C 13/023 138/109 |
| 4,452,563 A | * | 6/1984 | Belanger | F01D 21/045 415/9 |
| 4,643,229 A | * | 2/1987 | Hickin | B60R 15/00 138/109 |
| 4,840,201 A | | 6/1989 | Botsolas | |

(Continued)

*Primary Examiner* — James F Hook
(74) *Attorney, Agent, or Firm* — Dicke, Billig & Czaja, PLLC

(57) ABSTRACT

On example provides a containment sleeve for a pressurized piping system including a main body comprising a pliable fabric extending in longitudinal and transverse directions. The main body includes an exterior major surface and an opposing interior major surface, first and second opposed transverse edges, first and second opposed longitudinal edges, and a number of pleats extending from the interior major surface, each pleat having opposing sides of the longitudinal pleat being sewn together with breakaway stitching at a base of the pleat at the interior major surface. A number of transversely extending straps disposed on the exterior major surface between the first and second longitudinal edges, the straps to secure the main body about a portion of the piping system with the interior major surface facing the piping system.

7 Claims, 8 Drawing Sheets

A-A

(56) References Cited

U.S. PATENT DOCUMENTS

| | | | |
|---|---|---|---|
| 4,930,543 A | 6/1990 | Zuiches | |
| 5,195,784 A | 3/1993 | Richter | |
| 6,102,076 A * | 8/2000 | Romero, Jr. | F01N 13/085 |
| | | | 138/110 |
| 6,386,238 B1 * | 5/2002 | Hestetune | B65H 75/362 |
| | | | 138/110 |
| 6,997,483 B2 | 2/2006 | Perlatti | |
| 8,752,590 B2 * | 6/2014 | Petty | A63B 29/02 |
| | | | 138/110 |

* cited by examiner

US 11,313,493 B2

CONTAINMENT SLEEVE FOR PRESSURIZED PIPING SYSTEM

CROSS REFERENCE TO RELATED APPLICATIONS

This Non-Provisional Patent Applications claims benefit to Provisional Patent Application No. 62/794,300, filed Jan. 18, 2019, entitled "CONTAINMENT SLEEVE FOR PIPING SYSTEMS CONVEYING PRESSURIZED MATERIAL" which incorporated herein by reference.

BACKGROUND

Liquid mixtures are often pumped through piping systems under high pressure. Over time, pipes may become worn and fail, particular at pipe bends, where such bends are often formed using pipe elbows joined to straight pipe sections or other pipe elbows via couplings. If a pipe or joint ruptures (e.g., due to wearing and/or obstructions), pressurized material may be ejected from rupture point at a high velocity and potentially injure bystanders and damage adjacent property.

Pressurized piping systems are commonly employed to pump concrete mixtures to desired locations on construction sites, such as to successive floors of multi-story structures. Such systems typically includes a delivery piping system which is connected to an outlet pipe of a concrete pumping vehicle via a piping transition system. Typically, such piping transition systems include a first 90-degree coupling connected to the outlet pipe of the truck, a second 90-degree coupling connected to the delivery pipe, and a straight transition pipe connected between the first and second 90-degree couplings.

Cement trucks pump concrete at pressures of about 1200 pounds per square inch (psi). The flow of high-pressure cement can cause internal wear of the pipes, particularly at the couplings, which can eventually lead to a catastrophic failure of the piping system. The ejection of high pressure cement represents a hazard to people and objects in the vicinity of the rupture. Unfortunately, it is difficult to predict when such failures may occur (e.g., such event may be precipitated by unpredictable obstructions or blockages in the piping system).

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

Figure 1:
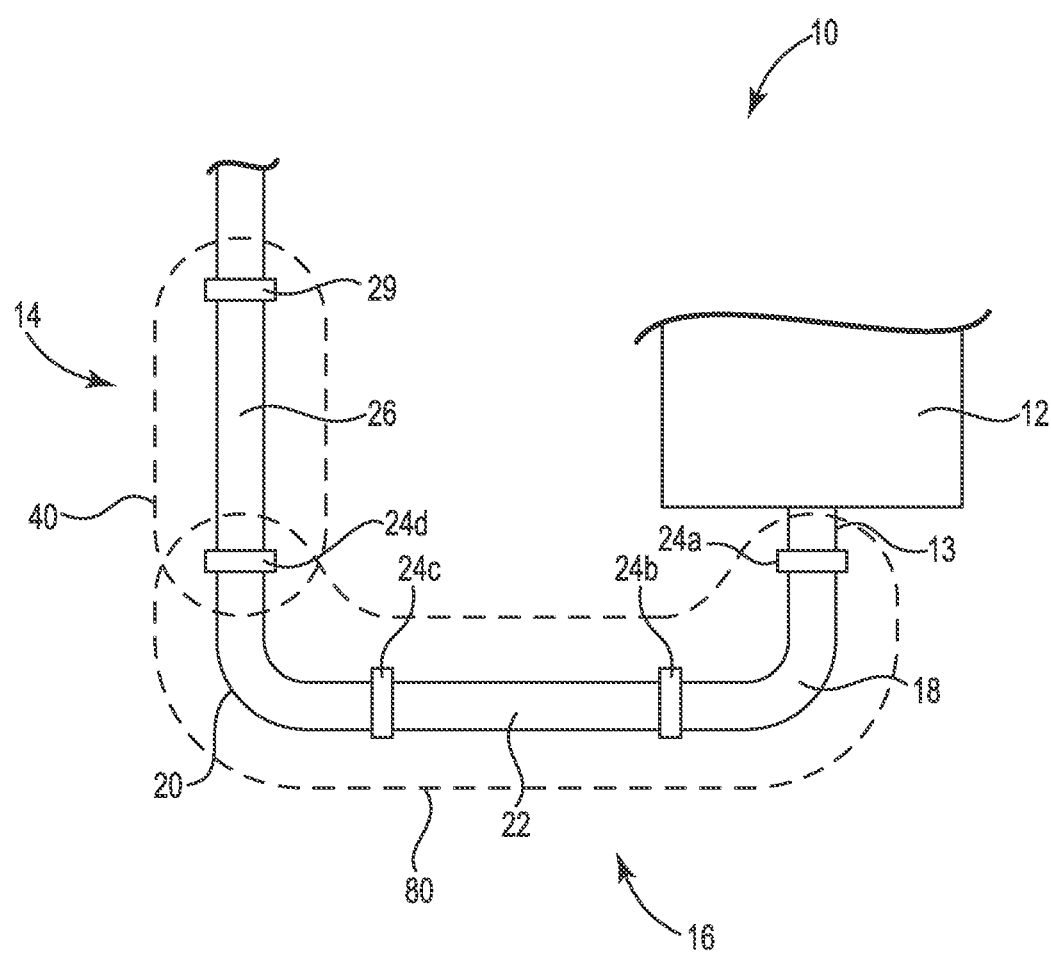
FIG. 1 is a block and schematic diagram generally illustrating a pressurized piping system for transporting concrete, according to one example.

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be understood that the features of the various exemplary embodiments described herein may be combined with each other, unless specifically noted otherwise.

Liquid mixtures are often pumped through piping systems under high pressure. Over time, pipes may become worn and fail, particular at pipe bends, where such bends are often formed by coupling pipe elbows to straight pipe sections or to other pipe elbows. If a pipe or joint ruptures (e.g., due to wearing and/or obstructions), pressurized material may be ejected from the rupture point at a high velocity and potentially injure bystanders and/or damage adjacent property.

Pressurized piping systems are commonly employed to pump concrete mixtures to desired locations on construction sites, such as to successive floors of multi-story structures. Such systems typically include a delivery piping system which is connected to an outlet pipe of a concrete pump via a piping transition system. Typically, such piping transition systems include a first 90-degree elbow coupled to the outlet pipe of the truck, a second 90-degree elbow coupled to the delivery pipe system, and a straight pipe section coupled between the first and second 90-degree elbows.

Concrete may be pumped at pressures of about 1200 pounds per square inch (psi). The flow of high-pressure cement causes internal wear of the piping system, particularly at the couplings and elbows, where such wear can eventually lead to a catastrophic failure of the piping system if undetected. The ejection of high pressure concrete represents a hazard to people and objects in the vicinity of the rupture. Unfortunately, even with regular inspections of the piping system, it is difficult to predict when such failures may occur, as such events may result from unexpected blockages within the piping system.

As will be described in greater detail herein, the present disclosure describes a pliable containment sleeve to wrap around pipes and couplings of a piping system to arrest the energy and contain concrete materials (or other materials in the case of piping systems other than concrete piping systems) in the case of a pipe failure (e.g., pipe rupture, coupling failure, etc.). In examples, the containment sleeve may be formed in different shapes and configurations for different applications (e.g., to fit different piping configurations).

In examples, each containment sleeve is made from a single, monolithic piece of fabric that includes no seams, as seams represent failure points that may not withstand the forces associated with a pipe rupture. In examples, the containment sleeves may include longitudinal pleats (to run in an axial direction of piping when installed thereon) and/or transverse pleats (running crossways to longitudinal axis of the piping system), wherein the pleats comprise regions of gathered material which are sewn with breakaway stitching to hold the pleats in place during installation on a piping system. The pleats improve the ease of installation of the containment sleeves by reducing the bulkiness of the containment sleeve to provide a more form-fitting installation, and reduce in interior volume of the containment sleeve when installed about a piping system.

During operation, upon rupture of a pipe, the breakaway stitching of the pleats "breaks away" under the pressure of the rupture and expands the internal volume of the warp from an initial volume to an expanded volume, thereby arresting the energy of the blowout and enabling the sleeve contain the contents of the blowout and providing protection to bystanders and property (as well protecting the environment and simplifying cleanup). In examples, the material of the containment sleeve is a high-strength (to withstand forces of a pipe blowout without tearing), light weight (to enable easy installation), liquid resistant, semi-permeable fabric that allows small amounts of gasses and liquids to seep through (e.g., water), but prevents the passage of particles (such as sand and aggregate of a concrete mixture, for example) and the spraying or "misting" of pressurized liquids. In one example, the material of the warp comprises ballistic nylon (e.g. 1050 ballistic nylon). While small amounts of liquid may seep through a containment sleeve of such fabric, high velocity ejection of liquids and solid particles is prevented.

The sleeves described herein represent an improvement over a netting type device that is designed to arrest energy as concrete ejects from the plumbing of a concrete pumping device. The containment sleeves disclosed herein contain the energy of a pipe rupture and direct expelled product along the pipe to remove risk to an operator. By containing the product, an operator that was exposed to mist and slurry that was too small to be contained by the netting type device, is protected from potential chemical burns and ejected solid particles. Secondarily, a containment sleeve, as described herein, contains expelled product so that cleanup can be performed in a more environmentally friendly fashion.

FIG. 1 generally illustrates an example of a high-pressure concrete piping system 10, where a concrete pumping vehicle 12 (e.g., concrete truck), having an outlet pipe 13, is connected to a delivery piping system 14 via a transition piping system 16. According to the illustrated example, transition piping system 16 includes first and second 90-degree elbows 18 and 20, a straight transition pipe 22, and a number of couplings 24a-24d, where first elbow 18 is coupled to outlet pipe 13 via coupling 24a, and transition pipe 22 is coupled between first and second elbows 18 and 20 via couplings 24b and 24c. Second elbow 20 is connected via coupling 24d to a pipe section 26 of delivery piping system 14. Delivery piping system 14 includes additional piping to extend to a desired pumping location, such as illustrating by pipe section 28 coupled to pipe section 26 via coupling 29. It is noted that FIG. 1 is for illustrative purposes, and that any number of piping configurations are possible, including transition piping systems including different numbers of straight pipe sections and elbows other than 90-degree elbows (e.g., 45-degrees, 30-degrees, etc.).

Figure 2A:
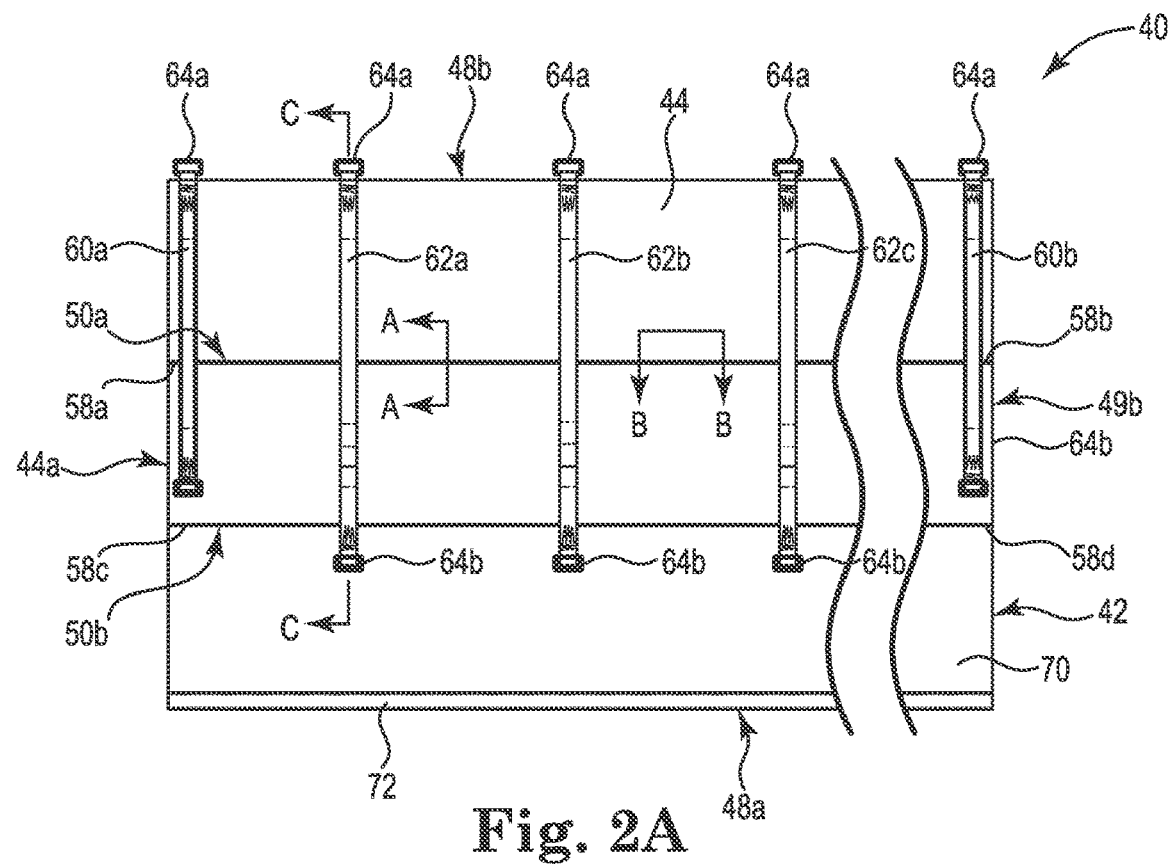
FIG. 2A is a top view generally illustrating a containment sleeve, according to one example.
Figure 2B:
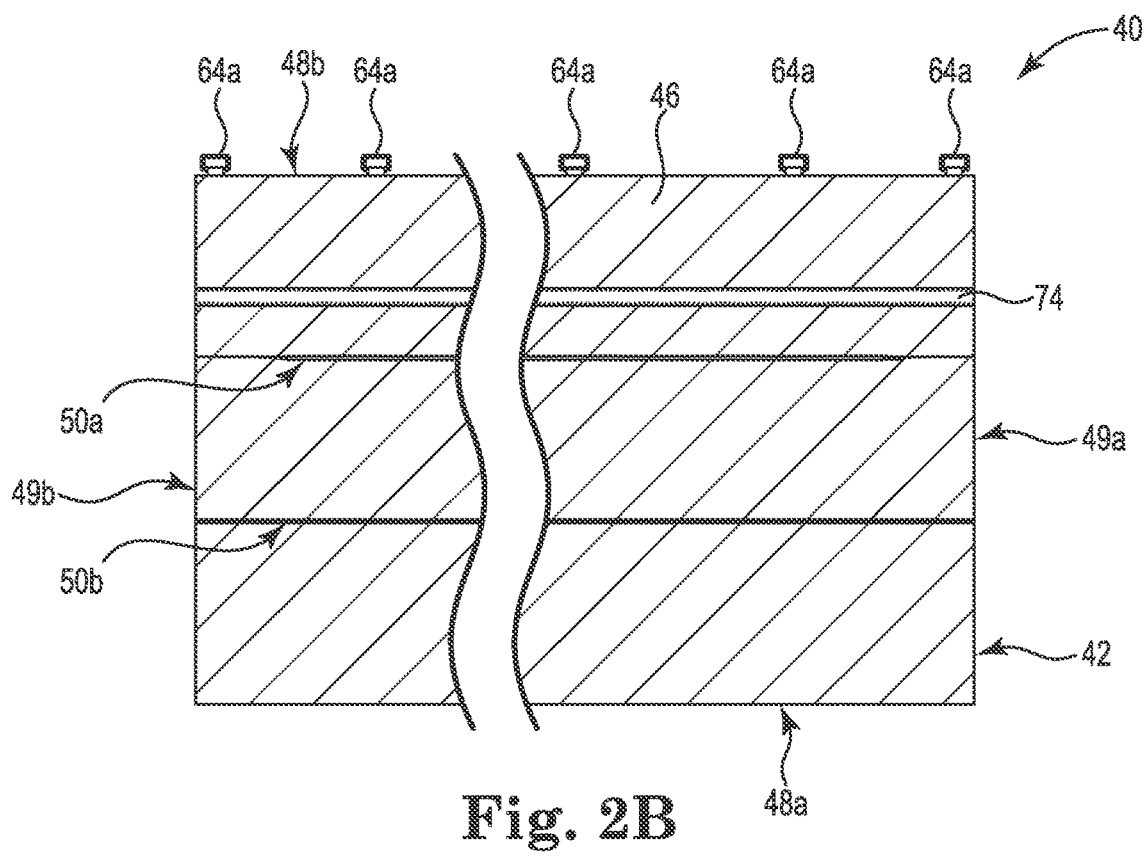
FIG. 2B is a bottom view generally illustrating the containment sleeve of FIG. 2A, according to one example.

FIGS. 2A-2E illustrate an example of a containment sleeve 40, in accordance with the present disclosure, which is configured to provide containment for a straight pipe section and corresponding couplings, such as straight pipe section 26 and corresponding couplings 24d and 29 of FIG. 1, for example. Containment sleeve 40 includes a main body 42 having a first major surface 44 and an opposing second major surface 46 extending between opposing first and second longitudinal edges 48a and 48b, and opposing first and second transverse edges 49a and 49b. First and second major surfaces 44 and 46 are respectively referred to as exterior and interior surfaces 44 and 46, as first major surface 44 forms an exterior surface and second major surface 46 forms an interior surface of containment sleeve 40 when installed (i.e., wrapped around) around a pipe section. FIGS. 2A and 2B are top and bottom plan views respectively illustrating exterior major surface 44 and interior major surface 46.

In one example, main body 42 is formed of a single, monolithic piece of fabric which includes no seams, as seams represent failure points that may not withstand the forces associated with pipe ruptures. In one example, main body 42 is formed of a light weight, high-strength, liquid resistant, semi-permeable fabric. In one example, the material of the main body 42 comprises ballistic nylon (e.g. 1050 ballistic nylon).

In examples, main body 42 includes a number of pleats 50 (e.g., one or more) which extend across at least a portion of main body 42. In one example, as illustrated, pleats 50 extend longitudinally across main body 42 between opposing transverse edges 49a and 49b. In one example, as illustrated, main body 42 includes a pair of pleats 50a and 50b. In one example, pleats 50 extend in parallel with first and second longitudinal edges 48a and 48b.

Figure 2C:
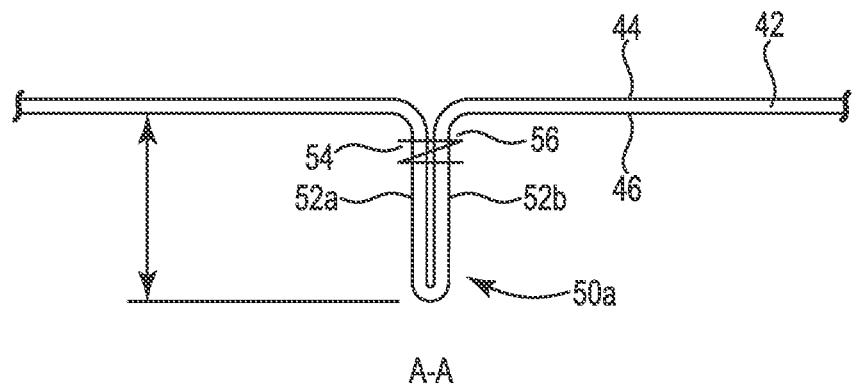
FIG. 2C is a cross-sectional view generally illustrating a pleat, according to one example.
Figure 2D:
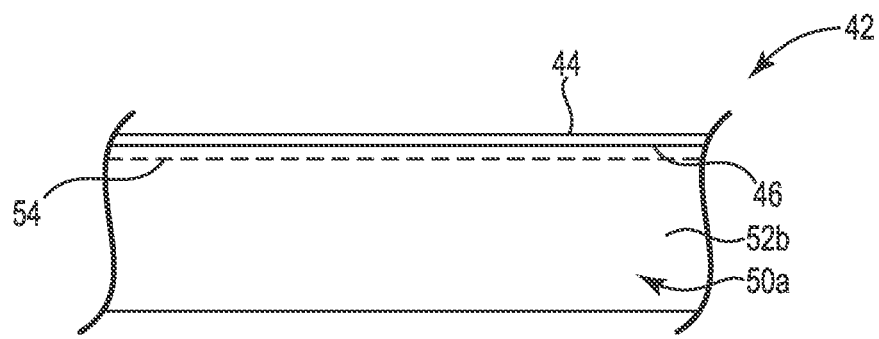
FIG. 2D is a cross-sectional view generally illustrating a longitudinal pleat, according to one example.

FIGS. 2C and 2D respectively show transverse and longitudinal cross-sectional views of portions of containment sleeve 40 of FIG. 2A illustrating an example of a pleat 50, such as pleat 50a. As illustrated, pleat 50a is formed by gathering fabric of main body 42 from interior surface 46 such that pleat 50a extends from interior major surface 46 (away from exterior major surface 44). In other examples, pleats 50 may be arranged so as to extend from exterior major surface 44 (away from interior major surface 46). As illustrated by FIG. 2D, in one example, longitudinal pleats 50 are rectangular in shape.

In one example, opposite sides 52a and 52b of pleat 50a are sewn together with breakaway stitching 54 at a base 56 of pleat 50a, where sidewalls 52a and 52b extend from interior major surface 46. In examples, breakaway stitching 56 is configured to hold pleats 50 in place under normal operating conditions (e.g., storage, installation/removal from piping systems), but to breakaway in response to forces from a piping system rupture so as to release pleat 50a such that containment sleeve 40 expands from an initial interior volume to an expanded interior volume. A depth, D, of pleat 50a and a length of pleat 50a in the longitudinal directions determines a change in interior volume provided by pleat 50a. In one example, the ends of pleats 50 at transverse edges 49a and 49b are sewn closed (i.e., sewn to main body 44) with non-breakaway stitching, as indicated at 58a-58d (see FIG. 2A), such that the ends of pleats 50 remain closed in response to forces from a pipe rupture so as to retain expelled material within the interior volume of containment sleeve 40. By expanding from an initial volume to an expanded volume, containment sleeve 40 arrests the energy released by a pipe rupture and contains a volume of material expelled from the rupture (e.g., concrete).

Returning to FIG. 2A, containment sleeve 40 further includes a first end strap 60a disposed along and in parallel with first transverse edge 49a, a second end strap 60b disposed along and in parallel with second transverse edge 49b, and a number of transversely extending middle straps 62, illustrated as middle straps 62a-62c, spaced between first and second end straps 60a and 60b. Each end strap 60 and middle strap 62 is a continuous strap (e.g., nylon webbing) having a closure system disposed at opposite ends thereof, such as an interlocking ring-type buckle system (sometimes referred to as a quick buckle system), as indicated by buckle rings 64a and 64b. In one example, first and second end straps 60a and 60b are continuous straps which are sewn with non-breakaway stitching along their entire length to exterior major surface 44 so that straps 60a and 60b do not detach from main body 42 in response to a pipe rupture. Although illustrated as having three middle straps, more or fewer than three middle straps 62 may be employed.

Figure 2E:
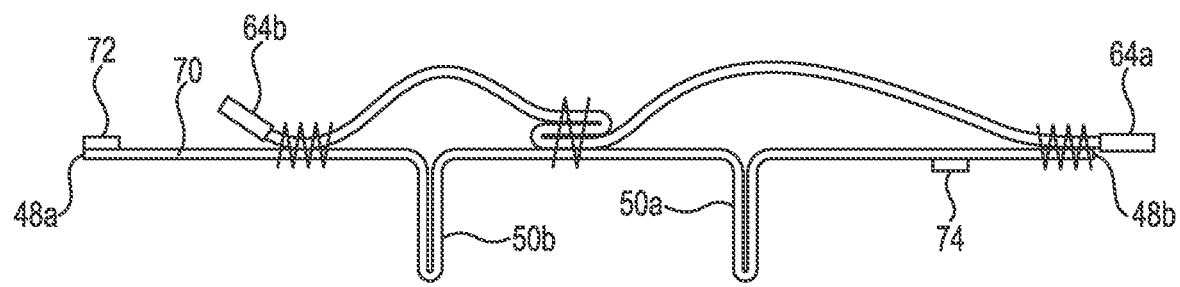
FIG. 2E is a cross-sectional view generally illustrating a strap, according to one example.

FIG. 2E is a cross-sectional view of containment sleeve 40 generally illustrating a middle strap 62, such as middle strap 62a, according to one example. In contrast to end straps 60, which are sewn with non-breakaway stitching along their entire lengths to main body 42, middle straps 62, as illustrated by middle strap 62a, are sewn to main body 42 with non-breakaway stitching only at their opposing ends, as indicated by stitching 66, so as to be permanently sewn between a longitudinal pleat 50 and longitudinal edge 48. As illustrated, each middle strap 62 is permanently sewn to main body 42 on opposite sides of longitudinal pleats 50. Between permanently sewn opposing ends, middle straps 62 are provided with slack 63 to jump over longitudinal pleats 50, such as longitudinal pleats 50a and 50b, where such slack 63 enables the longitudinal pleats 50 to expand outwardly (toward exterior surface 44) under a pipe rupture condition. In one example, each middle strap 62 is folded over onto itself one or more times to form a stack 68 which is stitched with breakaway stitching to main body 42 between longitudinal pleats 50, such as longitudinal pleats 50a and 50b, to prevent slack in strap 62 from accidentally catching on or becoming entangled with equipment and/or operators.

In one example, with reference to FIG. 2A, one end of each of the end straps 60 is spaced a distance D2 from longitudinal edge 48a, and one end of each of the middle straps 62 is spaced a distance D3 from longitudinal edge 48a such that a portion of main body 42 between longitudinal pleat 50b and longitudinal edge 48a forms a flap 70. In one example, containment sleeve 40 includes a hook and loop type closure system, with a hook portion 72 permanently sewn along on exterior major surface 44 along longitudinal edge 48a and a corresponding loop portion 74 permanently sewn on interior major surface 46.

Figure 2F:
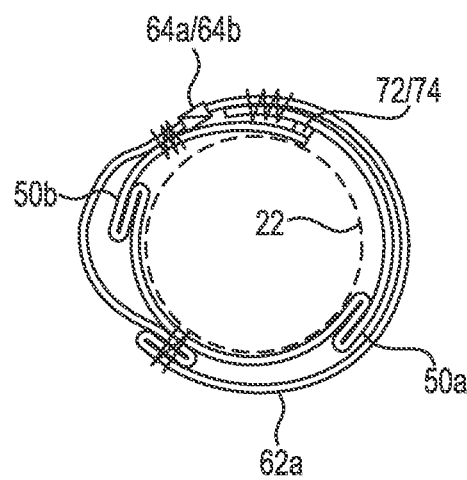
FIG. 2F is a cross-sectional view generally illustrating the containment sleeve of FIG. 2A installed about a pipe, according to one example.

FIG. 2F is a cross-sectional view illustrating containment sleeve 40 installed about a pipe section, such as pipe section 26 in FIG. 1 (as illustrated by the dashed lines in FIG. 1). As illustrated, when wrapped around straight pipe section 26, flap 70 tucks under longitudinal edge 48b with hook portion 72 engaging loop portion 74 to assist in holding containment sleeve 40 about straight pipe section 26 (which may be extending vertically). Buckles 64a and 64b at opposing ends of each of end strap 60 and each middle strap 62 interlock with one another to secure containment sleeve 40 to the pipe section (e.g., pipe section 26). In one example, each of the end straps 60 and middle straps 62 is non-adjustable in length. In other examples, each of the end straps 60 and middle straps may be adjustable in length (such as illustrated by FIG. 3E below), so that the straps may be tightened or cinched, particularly end straps 60, to better fit containment sleeve 40 about pipe 26.

FIGS. 3A-3E illustrate another example of a containment sleeve 80, in accordance with the present disclosure. Since transition piping systems often include two 90-degree elbows joined by a straight pipe section which together form a curved or U-shaped piping transition, such as 90-degree elbows 18 and 20, and straight pipe section 22 of transition piping system 16 of FIG. 1, containment sleeve 80 is arranged with a curved or U-shaped pocket to wrap around and contain such a transition piping system (such as indicated by the dashed lines in FIG. 1).

Figure 3A:
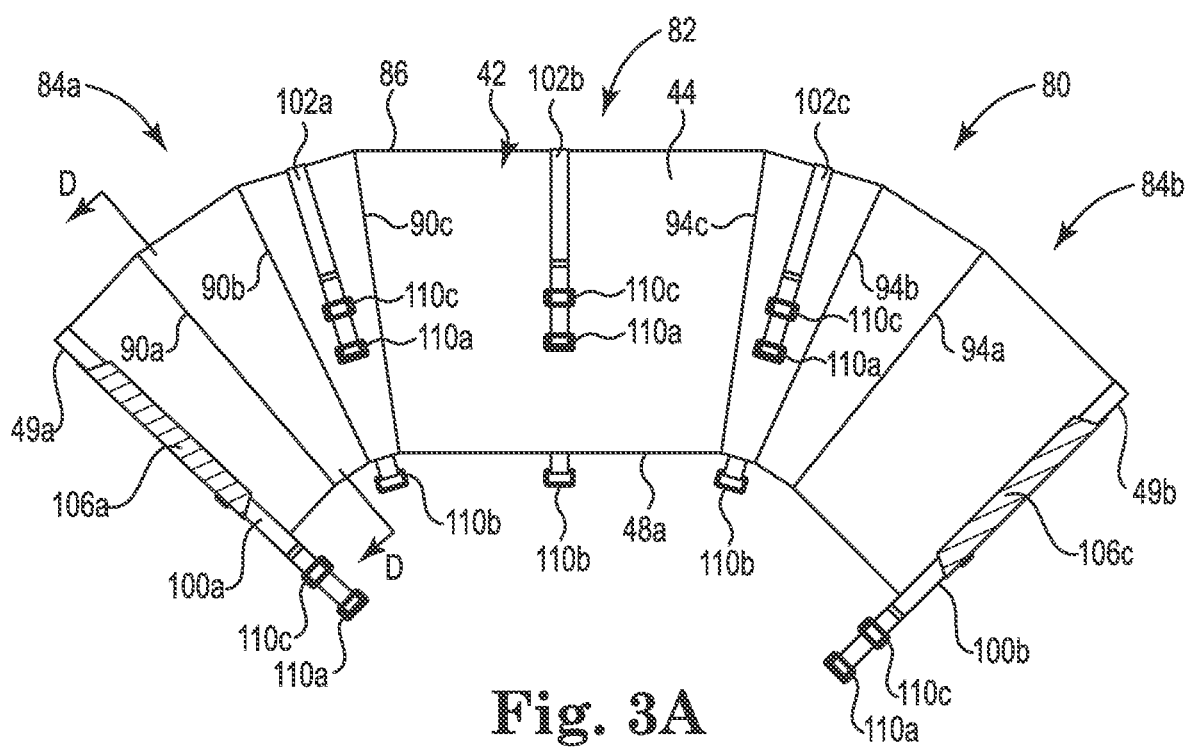
FIG. 3A is a top view generally illustrating a containment sleeve, according to one example.
Figure 3B:
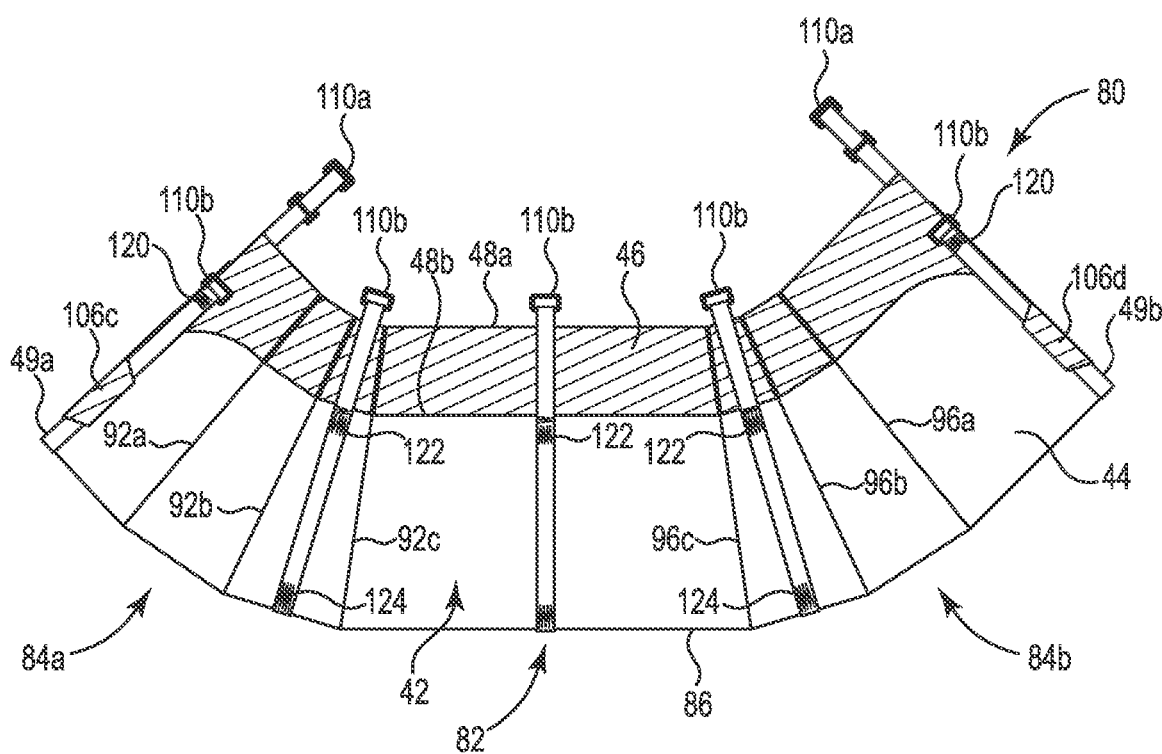
FIG. 3B is a bottom view generally illustrating the containment sleeve of FIG. 2A, according to one example.
Figure 3C:
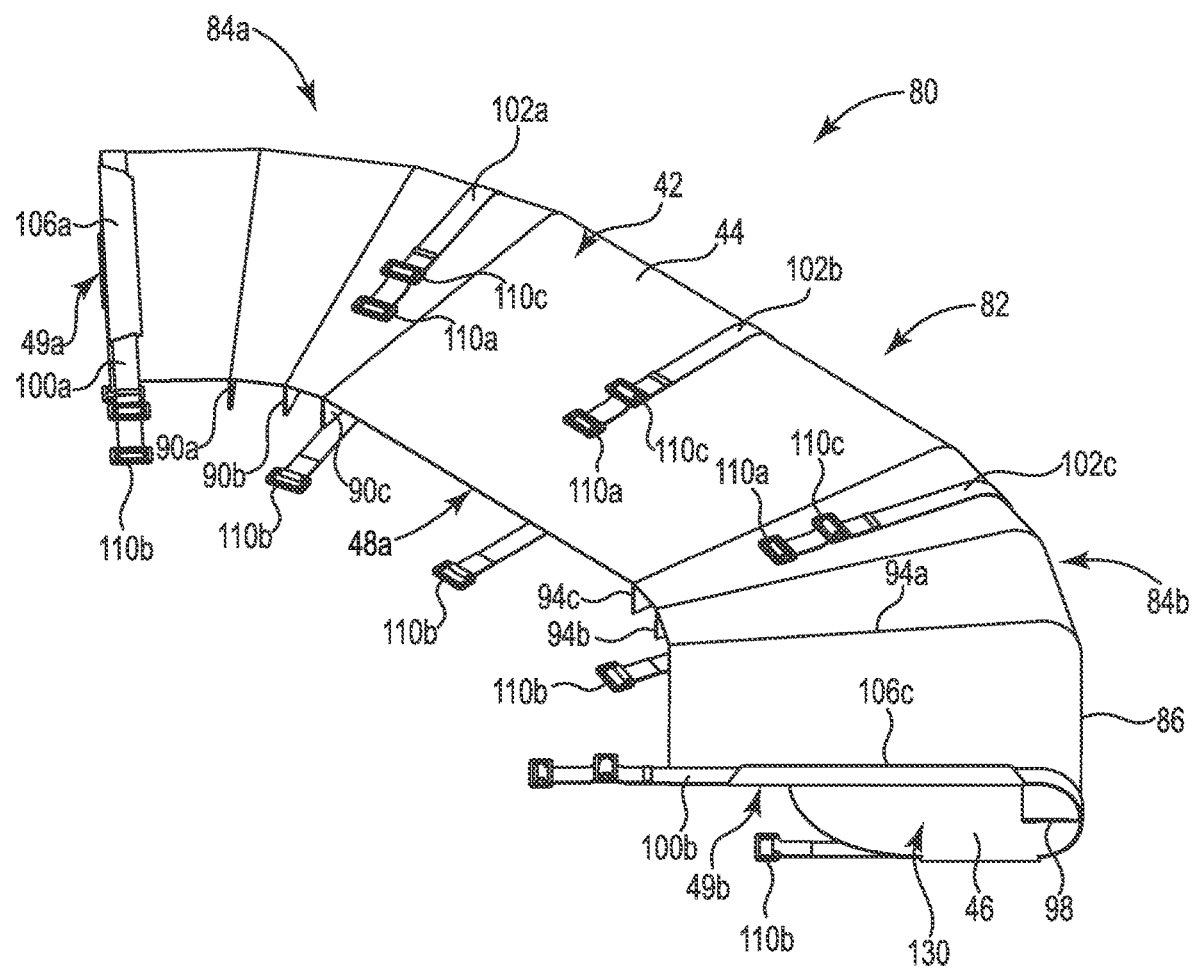
FIG. 3C is a perspective view generally illustrating the containment sleeve of FIG. 2A, according to one example.

FIGS. 3A, 3B, and 3C respectively illustrate top, bottom, and perspective views of containment sleeve 80, according to one example. Similar to containment sleeve 40, containment sleeve 80 includes main body 42 having exterior major surface 44, interior major surface 46, first longitudinal edge 48a, second longitudinal edge 48b, first transverse edge 49a, and second transverse edge 49b. In contrast to containment sleeve 40, which is configured for containment of straight pipe sections, as described above, containment sleeve 80 is arranged for containment of a U-shaped transition piping system, such as transition piping system 16 of FIG. 1, and is arranged with a central straight section 82 (for straight pipe 22), a first angled section 84a (for elbow 18) at one end of straight section 82 and including first transverse edge 49a, and a second angled section 84b (for elbow 20) at an opposing end of straight section 82 and including second transverse edge 49b.

In one example, a number of transverse pleats 90a-90c extending from interior major surface 46 and extending between longitudinal edge 48a and a fold line 86, and a number of corresponding transverse pleats 92a-92c extending from interior major surface 46 and extending between longitudinal edge 48b and a fold line 86 together create the angle of first angled section 84a. The angle is created by pleats transverse 90a-90c and 92a-92c having more fabric respectively gathered along first longitudinal edge 48a and second longitudinal edge 48b than along fold axis 86 so that the pleats are wedge-shaped in cross-section.

Figure 3D:
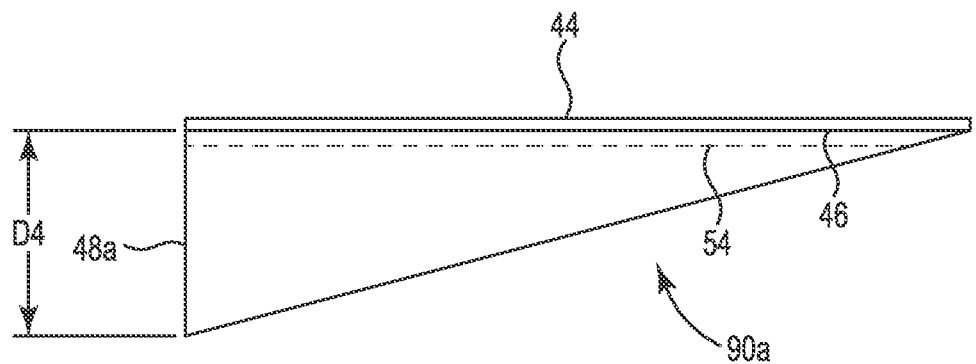
FIG. 3D is a cross-sectional view generally illustrating a transverse pleat, according to one example.
Figure 3E:
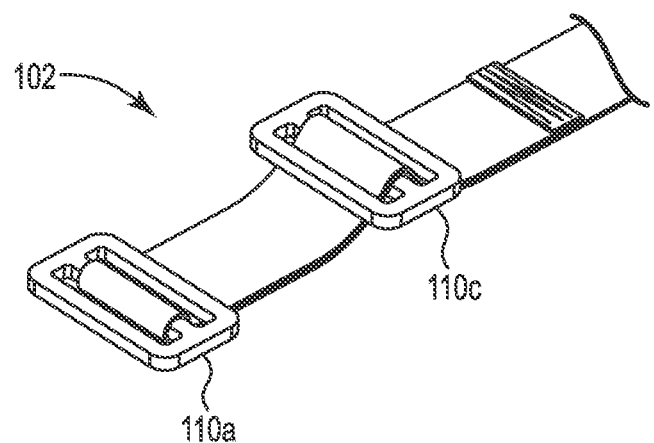
FIG. 3E is a cross-sectional view generally illustrating a buckle and strap length adjustment system, according to one example.

FIG. 3D is a side view generally illustrating transverse pleat 90a, according to one example. As illustrated, transverse pleat 90a is wedge-shaped, with more fabric of main body 42 gathered along first longitudinal surface 48a than at fold axis 86. Breakaway stitching 54 at a base of transverse pleat 90a holds transverse pleat 90a in place during normal operating conditions, but breaks away to enable transverse pleat 90 to expand outwardly (toward exterior surface 44) in response to forces of a pipe rupture.

Returning to FIGS. 3A-3C, In one example, a number of transverse pleats 94a-94c extending from interior major surface 46 and extending between longitudinal edge 48a and a fold line 86, and a number of corresponding transverse pleats 96a-96c extending from interior major surface 46 and extending between longitudinal edge 48b and a fold line 86 together create the angle of second angled section 84b. Similar to the of first angled section 84a, the angle of second angled section 84b is created by transverse pleats 94a-94c and 96a-96c having more fabric respectively gathered along first longitudinal edge 48a and second longitudinal edge 48b so that the pleats are wedge-shaped in cross-section (see FIG. 3D).

It is noted that any number of various angles may be achieved for angled sections 84a and 84b relative to central straight section 82 based on a number of transverse pleats employed and a depth of each pleat (see depth, D4, in FIG. 3D). Although three transverse pleats are illustrated as being employed to form first and second angled sections 84a and 84b, more or fewer than three transverse pleats may be employed.

In one example, with reference to FIG. 3C, containment sleeve 80 further includes a longitudinal pleat 98 extending between first and second transverse edges 49a and 49b, where longitudinal pleat 98 forms fold line or axis 86, and where longitudinal pleat 98 is similar to longitudinal pleats 50a and 50b of containment sleeve 40 (e.g., rectangular in cross-section, see FIG. 2D).

According to one example, containment sleeve 80 further includes a first end strap 100a disposed along and in parallel with first transverse edge 49a, a second end strap 100b disposed along an in parallel with second transverse edge 49b, and a number of transversely extending middle strips 102, illustrated as middle straps 102a-102c, which are disposed between and do not cross over any of the transverse pleats 90, 92, 94, and 96. Each end strap 100 and middle strap 102 is continuous strap (e.g., formed of nylon webbing) having a closure system disposed at opposite ends thereof, such as an interlocking ring-type buckle system (sometimes referred to as a quick buckle system), as indicated by buckle rings 110a and 110b. In one example, end straps 110a-110b, and middle straps 102a-102c are adjustable in length at an end proximate to buckle 110a adjacent to longitudinal edge 48a via an adjust slide 110c (see also FIG. 3E).

In one example, each end strap 100a and 100b is permanently sewn at one end, proximate to second longitudinal edge 48b, as indicated by stitching 120 and continuously extends through, and is free to slide within, corresponding belt loops 106a/106b and 106c/106d. As such, each end strap continuously extends about a portion of exterior major surface 44 of main body 42. In one example, each middle strap 102a-102c is permanently sewn to exterior major surface 44 of main body 42 on only one side of longitudinal pleat 98, as indicated by stitching 122 and 124, so as to enable longitudinal pleat 98 to expand in response to forces of a pipe rupture when containment sleeve 80 is disposed thereon. In one example, as illustrated, middle straps 102a-102c are sewn to main body 42 between second longitudinal edge 48b and fold line 86.

With reference to FIG. 3C, forming transverse pleats 90a-90c and 92a-92c to form first angled section 84a, and transverse pleats 94a-94c and 96a-96c to form second angled section 84b results in main body 42 "folding over" along fold line or fold axis 86 to form a curved or U-shaped pocket 130 to receive transition piping system 16 (see FIG. 1). In one example, central straight section 82 is to receive straight pipe section 22, first angled section 84a is to receive first elbow 18, and second angled section 84b is to receive second elbow 20 (as illustrated by dashed line 80 in FIG. 1).

After containment sleeve 80 has been slid onto transition piping system 16, such that transition piping system 16 is within pocket 130, first and second end straps can be respectively coupled and cinched about piping sections beyond couplings 24a and 24d to tightly secure first and second transverse edges 49a and 49b thereto. Middle straps 102a-102c are coupled and cinched about couplings 24b and 24c, and about straight pipe section 22.

In accordance with the present disclosure, a containment sleeve may include any number straight sections and angled sections, where each angled section can be at any desired angle based on a depth and number of wedge-shaped transversely extending pleats are employed. Additionally, by employing such wedge-shaped transversely extending pleats, such angled and straight sections may be formed from a single, monolithic piece of fabric forming main body 42 without requiring seams, thereby improving the strength and performance of the containment sleeve (as seams represent weak spots that may be susceptible to tearing in response to forces caused by a pipe rupture).

Figure 4:
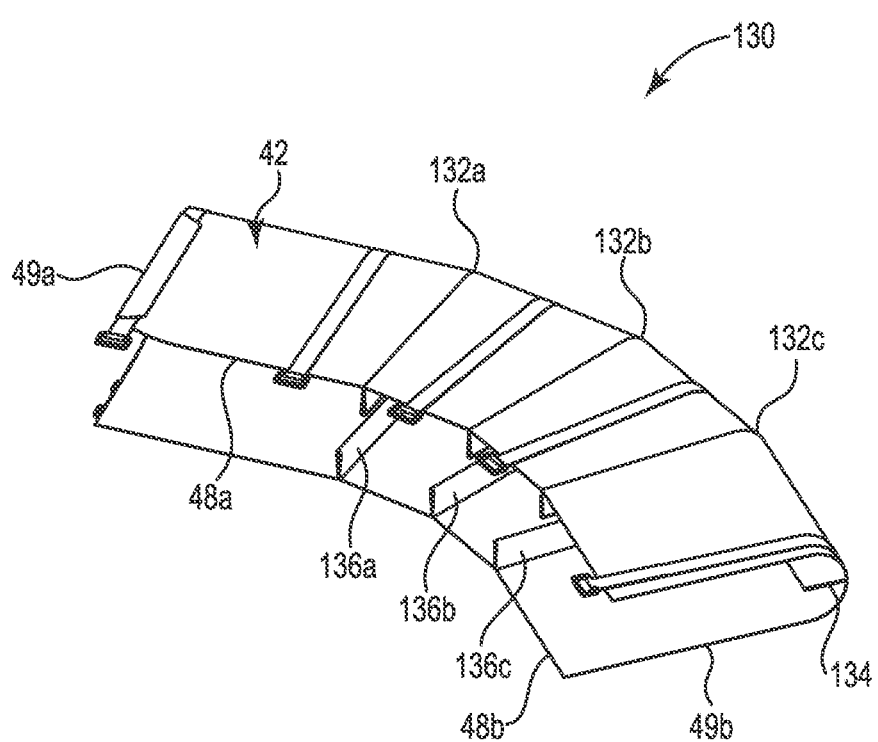
FIG. 4 is a perspective view generally illustrating the containment sleeve, according to one example.

FIG. 4, for example, illustrates a containment sleeve 130, which is similar to containment sleeve 80, but includes three transversely extending pleats 132a, 132b, and 132c extending between a longitudinally extending pleat 134 and first longitudinal edge 48a of main body 42, and three transversely extending pleats 136a, 136b, and 136c extending between longitudinal pleat 134 and opposing second longitudinal edge 48b. Such arrangement provides does not include a central straight section, with containment sleeve 130 configured to receive and wrap around a pipe elbow, such as pipe elbow 20, for example (see FIG. 1). It is noted that any number of configurations may be arranged from main body 42 using transversely extending, wedge-shaped pleats.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A containment sleeve for a pressurized piping system comprising:
    a main body comprising a pliable fabric extending in longitudinal and transverse directions, the body including:
        an exterior major surface and an opposing interior major surface;
        first and second opposed transverse edges,
        first and second opposed longitudinal edges; and
        a number of pleats extending from the interior major surface, each pleat having opposing sides sewn together with breakaway stitching at a base of the pleat at the interior major surface; and
    a number of transversely extending straps disposed on the exterior major surface between the first and second longitudinal edges, the straps to secure the main body about a portion of the piping system with the interior major surface facing the piping system.

2. The containment sleeve of claim 1, the number of pleats including at least one longitudinal pleat extending from the interior main surface at least partially across the main body between the first and second opposed transverse edges, opposing sides of the longitudinal pleat being sewn together with breakaway stitching at a base of the pleat at the interior main surface.

3. The containment sleeve of claim 1, the number of pleats including a number of transversely extending pleats extending from the interior main surface at least partially across the main body between the first and second opposed longitudinal edges, opposing sides of each transversely extending pleat being sewn together with breakaway stitching at a base of the pleat at the interior main surface.

4. The containment sleeve of claim 1, including:
a continuous first end strap extending along the first transverse edge on the exterior main surface;
a continuous second end strap extending along the second transverse edge on the exterior main surface; and
a number of middle straps disposed between the first and second end straps and extending transversely between the first and second opposed longitudinal edges.

5. The containment sleeve of claim 1, the main body comprising a semi-permeable fabric.

6. The containment sleeve of claim 5, the semi-permeable fabric comprising ballistic nylon.

7. The containment sleeve of claim 1, the main body having an initial interior volume when installed on a pipe in a first condition when the pleats are held with breakaway stitching, and an expanded volume upon the breakaway stitching being released and the pleats expanding.

* * * * *